United States Patent
Wang et al.

(10) Patent No.: US 12,293,224 B2
(45) Date of Patent: May 6, 2025

(54) TENANT FAIRNESS IN A MULTI-TENANT ENVIRONMENT

(71) Applicant: Cisco Technology, Inc., San Jose, CA (US)

(72) Inventors: Xiaohu Wang, Cupertino, CA (US); Ajeet Pal Singh Gill, Fremont, CA (US); Srilatha Tangirala, San Jose, CA (US); Nithin Bangalore Raju, Santa Clara, CA (US); Prabahar Radhakrishnan, Dublin, CA (US); Vivek Agarwal, Campbell, CA (US); Balaji Sundararajan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 511 days.

(21) Appl. No.: 17/390,187

(22) Filed: Jul. 30, 2021

(65) Prior Publication Data

US 2022/0326995 A1    Oct. 13, 2022

Related U.S. Application Data

(60) Provisional application No. 63/172,228, filed on Apr. 8, 2021.

(51) Int. Cl.
    *G06F 8/20*       (2018.01)
    *G06F 9/455*      (2018.01)
    *G06F 9/50*       (2006.01)

(52) U.S. Cl.
    CPC ........ *G06F 9/5005* (2013.01); *G06F 9/45558* (2013.01); *G06F 2009/4557* (2013.01)

(58) Field of Classification Search
    CPC ............... G06F 9/5005; G06F 9/45558; G06F 2009/4557; G06F 2209/504; H04L 41/40; H04L 41/5051; H04L 41/5054
    See application file for complete search history.

(56) References Cited

U.S. PATENT DOCUMENTS

10,110,506 B2 * 10/2018 Kasso ................... H04L 47/745
10,965,610 B1    3/2021 McHugh et al.
(Continued)

OTHER PUBLICATIONS

Chengyuan Huang et al. "Providing Guaranteed Network Performance across Tenants: Advances, Challenges and Opportunities" (Year: 2021).*

*Primary Examiner* — Kevin L Young
*Assistant Examiner* — Abdou K Seye
(74) *Attorney, Agent, or Firm* — Polsinelli P.C.

(57) ABSTRACT

A method for allocating resources of a virtual controller is disclosed. The method comprises: allocating resources of a virtual controller to a first tenant, wherein the first tenant is allocated a first tenant quantity of guaranteed resources of the virtual controller and a second tenant is allocated a second tenant quantity of guaranteed resources of the virtual controller; determining that resources requested by the first tenant are greater than the first tenant quantity of guaranteed resources; determining that the virtual controller has unutilized resources sufficient to at least partially provide additional resources beyond the first tenant quantity of guaranteed resources to the first tenant; and temporarily provisioning the additional resources to the first tenant, wherein the additional resources are greater than the first tenant quantity of guaranteed resources.

20 Claims, 10 Drawing Sheets

(56) References Cited

U.S. PATENT DOCUMENTS

| | | |
|---|---|---|
| 2012/0174113 A1 | 7/2012 | Pohlmann |
| 2014/0157274 A1 | 6/2014 | Ballani et al. |
| 2017/0220392 A1 | 8/2017 | Cropper et al. |
| 2017/0244784 A1 | 8/2017 | Lam et al. |
| 2017/0279735 A1* | 9/2017 | Yousaf .................. G06F 9/5083 |
| 2017/0359271 A1* | 12/2017 | Koh .................... H04L 41/0654 |
| 2018/0039525 A1 | 2/2018 | Boss et al. |
| 2019/0129729 A1* | 5/2019 | Peterkofsky .......... G06F 9/5072 |
| 2019/0317816 A1* | 10/2019 | Chandran .............. G06F 9/5077 |
| 2020/0106712 A1* | 4/2020 | Sundaram ............... H04L 47/72 |

\* cited by examiner

TENANT FAIRNESS IN A MULTI-TENANT ENVIRONMENT

CROSS REFERENCE TO RELATED APPLICATIONS

This application claims priority to U.S. provisional application No. 63/172,228, filed on Apr. 8, 2021, which is expressly incorporated by reference herein in its entirety.

TECHNICAL FIELD

The present disclosure relates generally to assigning tenants to a virtual controller for software defined networking functions, and, more particularly, to providing tenants fairness in a multi-tenant network where tenants are permitted to utilize more than their guaranteed quantity of resources.

DESCRIPTION OF THE RELATED TECHNOLOGY

A multi-tenant system assigns each tenant to a respective virtual environment where the virtual environment is limited to a maximum amount of resources. Multiple respective virtual environments are instantiated on the same hardware. This maximum amount of resources is sufficient to provide a guaranteed quality of service to the tenant. The number of respective virtual environments that can be assigned to the same hardware is usually such that if each virtual environment is able to consume its maximum resources simultaneously. However, it is not often the case that all tenants require their maximum amount of resources at the same time, which results in idle resources on most physical machines.

DETAILED DESCRIPTION

Figure 1:
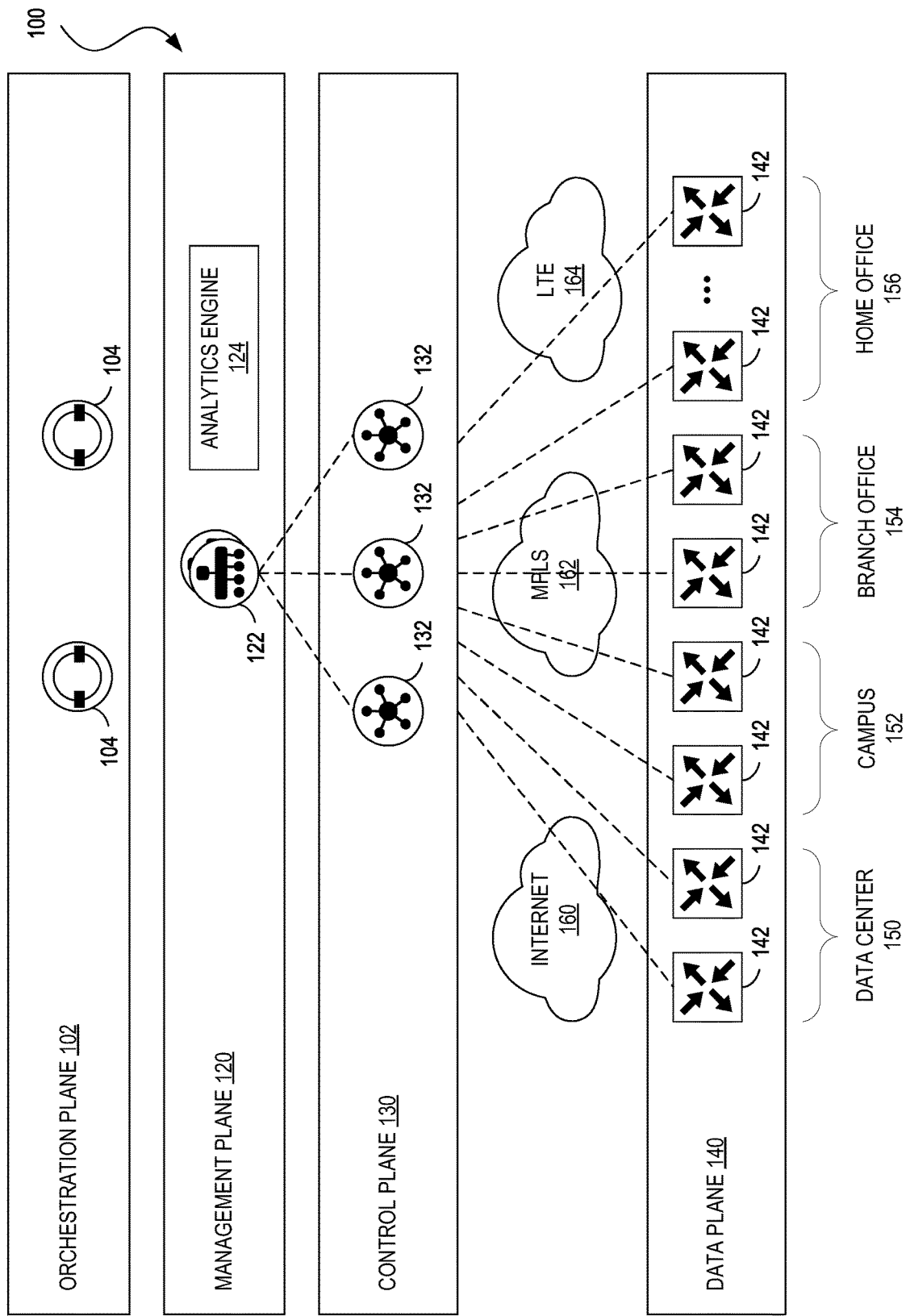
FIG. 1 illustrates an example of a high-level network architecture in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In a multi-tenant network configuration, each network device can be configured to share resources. However, it is important to guarantee resources so that a large-scale tenant does not take precedence over a small-scale or medium-scale tenant. The large-scale tenant's needs must be balanced to ensure that their network is properly functioning while also ensuring that network hardware in the multi-tenant service provider is efficiently utilized. Accordingly, equitable allocation of resources to each tenant is further described below.

Systems, methods, and computer-readable media are provided for allocating resources of a virtual controller to a first tenant. An example method can include allocating resources of a virtual controller to a first tenant, wherein the first tenant is allocated a first tenant quantity of guaranteed resources of the virtual controller and a second tenant is allocated a second tenant quantity of guaranteed resources of the virtual controller; determining that resources requested by the first tenant are greater than the first tenant quantity of guaranteed resources; determining that the virtual controller has unutilized resources sufficient to at least partially provide additional resources beyond the first tenant quantity of guaranteed resources to the first tenant; and temporarily provisioning the additional resources to the first tenant, wherein the additional resources are greater than the first tenant quantity of guaranteed resources, wherein the additional resources are greater than the first tenant quantity of guaranteed resources.

An example system can include one or more processors and at least one computer-readable storage medium storing instructions which, when executed by the one or more processors, cause the one or more processors to allocate resources of a virtual controller to a first tenant, wherein the first tenant is allocated a first tenant quantity of guaranteed resources of the virtual controller and a second tenant is allocated a second tenant quantity of guaranteed resources of the virtual controller; determine that resources requested by the first tenant are greater than the first tenant quantity of guaranteed resources; determine that the virtual controller has unutilized resources sufficient to at least partially provide additional resources beyond the first tenant quantity of guaranteed resources to the first tenant; and temporarily provision the additional resources to the first tenant, wherein the additional resources are greater than the first tenant quantity of guaranteed resources.

In some examples, the temporary provisioning of the additional resources is provided on a best effort basis.

An example non-transitory computer-readable storage medium having stored therein instructions which, when executed by a processor, cause the processor to receive a request to allocate the resources of the virtual controller to a third tenant based on a second tenant quantity of guaranteed resources of the virtual controller, wherein a second virtual controller hosting the third tenant failed; and receive a request to deallocate the instance of the first tenant, wherein a network manager moves the first tenant to a third virtual controller to balance a plurality of virtual controllers.

In some examples, guaranteed resources for tenants including the first tenant, the second tenant, and third tenant are greater than maximum resources of the virtual controller, and wherein guaranteed resources for tenants including the second tenant and the third tenant and excluding the first tenant are less than the maximum resources of the virtual controller.

In some examples, the resources comprise network bandwidth and memory consumption.

In some examples, the virtual controller provides a quantity of guaranteed resources to a plurality of tenants.

In some examples, the plurality of tenants are allocated resources in a single virtual machine.

Systems, methods, and computer-readable media are provided for allocating resources of a virtual controller to a first tenant. An example method can include determining a first virtual controller will host a first tenant based on a first tenant quantity of guaranteed resources and available resources in the first virtual controller; requesting the first virtual controller to create an instance of the first tenant; and receiving resource consumption information of tenants assigned to the first virtual controller, wherein the resource consumption information includes information that identifies the first tenant requests additional resources beyond the first tenant quantity of guaranteed resources and the first virtual controller temporarily provisions the additional resources to the first tenant.

An example system can include one or more processors and at least one computer-readable storage medium storing instructions which, when executed by the one or more processors, cause the one or more processors to determine a first virtual controller will host a first tenant based on a first tenant quantity of guaranteed resources and available resources in the first virtual controller; request the first virtual controller to create an instance of the first tenant; and receive resource consumption information of tenants assigned to the first virtual controller, wherein the resource consumption information includes information that identifies the first tenant requests additional resources beyond the first tenant quantity of guaranteed resources and the first virtual controller temporarily provisions the additional resources to the first tenant.

In some examples, the temporary provisioning of the additional resources is greater than the first tenant quantity of guaranteed resources are best effort.

An example non-transitory computer-readable storage medium having stored therein instructions which, when executed by a processor, cause the processor to determine that the first virtual controller and the third virtual controller have balanced loads based on moving the instance of the first tenant to the third virtual controller.

In some examples, the resources comprise network bandwidth and memory consumption.

In some examples, each tenant of the first virtual controller is temporarily provisioned with unutilized resources of the first virtual controller on a best effort basis.

In some examples, the plurality of tenants are allocated resources in a single virtual machine.

Example Embodiments

A solution is described below to equitably provide resources of a multi-tenant network to allow both large-scale and small-scale tenants to fully utilize network hardware, while minimizing the number of network hardware devices. In particular, a network manager is configured to allocate resources to guarantee quality of service such as a minimum amount of resources for each tenant. Resources that exceed the minimum amount of resources are allocated on a best-effort basis. Further, in the event of a network controller failure, the network manager is configured to allocate the tenants to different network controllers in a balanced manner to ensure that each tenant's network continues to function.

The present technology results in a more efficient use of hardware resources that is achieved by assigning multiple tenants to the same virtual environment. Such assignment of multiple tenants into the same virtual environment creates opportunity to better hardware utilization, but also increases risk that one tenant will consume so many resources that the virtual environment will not be able to support the minimum amount of resources allocated to another tenant.

The present technology balances more efficient utilization of hardware resources with the risk that one tenant will consume too many of those resources by intelligently grouping tenants in the same virtualized environment—a virtual network controller or switch—and by creating redundancy in the network by assigning each tenant to more than one virtualized environment. Additionally, the present technology has the ability to scale back the memory and processor usage of the first tenant to permit the another tenant to receive the minimum amount of resources allocated for their utilization.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
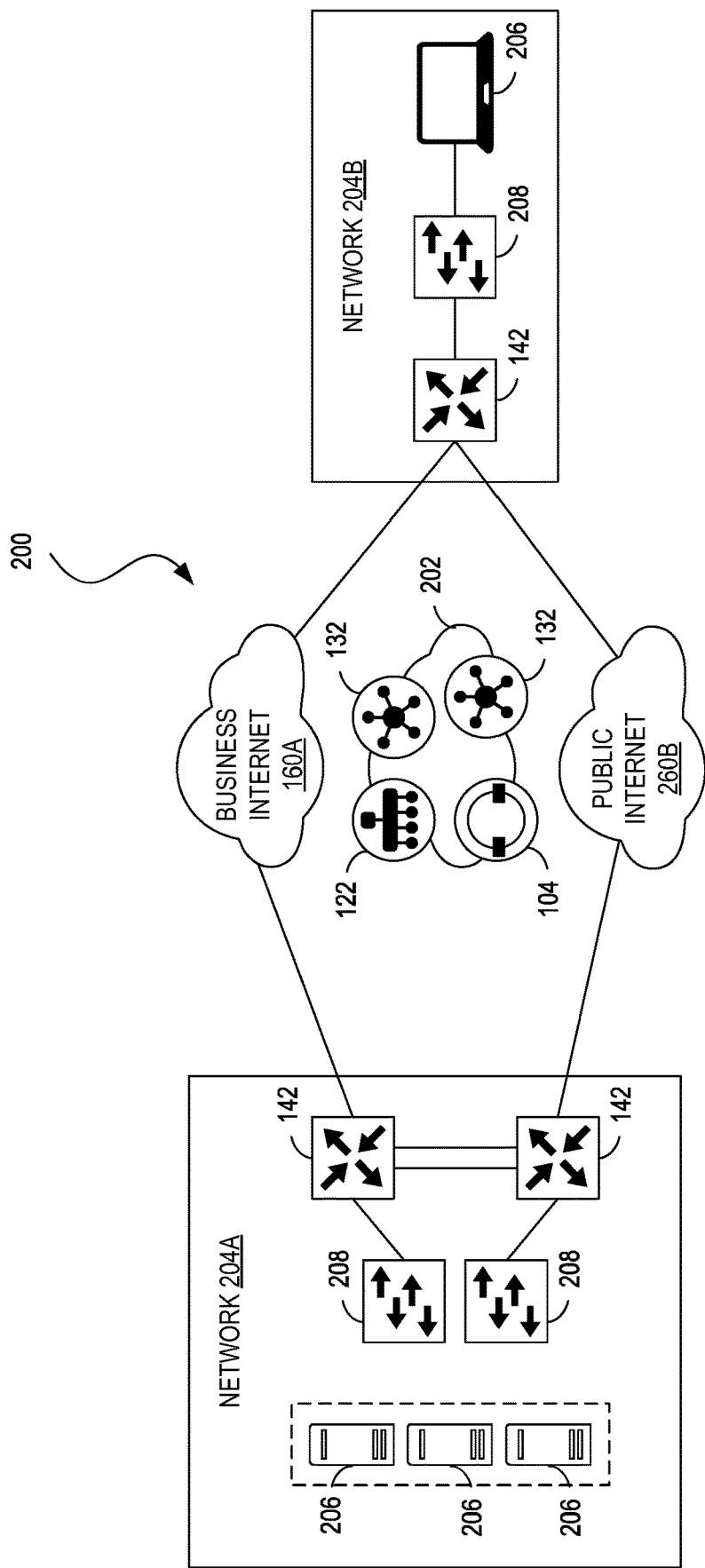
FIG. 2 illustrates an example of a network topology in accordance with an embodiment.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
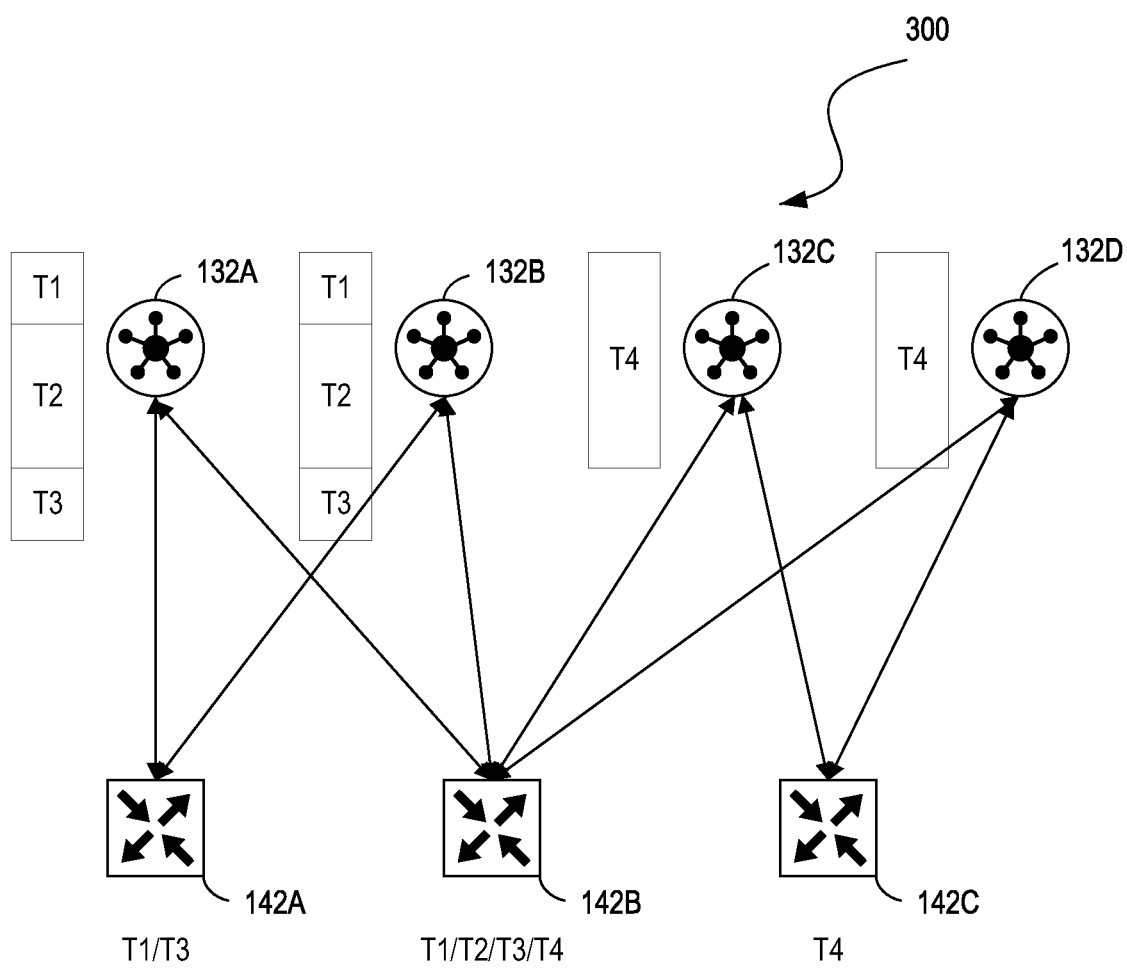
FIG. 3 illustrates an example of a multi-tenant environment in accordance with an embodiment.

FIG. 3 illustrates an example of a multi-tenant environment 300 in accordance with an embodiment. Resources of network controller 132A are allocated to tenants T1, T2, and T3. Resources of network controller 132B are allocated to tenants T1, T2, and T3. Resources of network controller 132C and network controller 132D are allocated to tenant T4. Each of the tenants T1, T2, T3, and T4 can be connected to one or more of network controller 132A, network controller 132B, network controller 132C, and network controller 132D. Network controllers, for example, 132A, 132B, 132C, and 132D can be located across geographical regions to protect site failure and provide redundancy.

In some embodiments, each edge network device is connected to one or more network controllers for load balancing and high availability. For example, the edge network device 142A is connected to network controller 132A and network controller 132B. The edge network device 142B is connected to network controller 132A, network controller 132B, network controller 132C, and network controller 132D. The edge network device 142C is connected to network controller 132C and network controller 132D. If one controller fails, an edge network device can remain connected to a remaining network controller.

Figure 4:
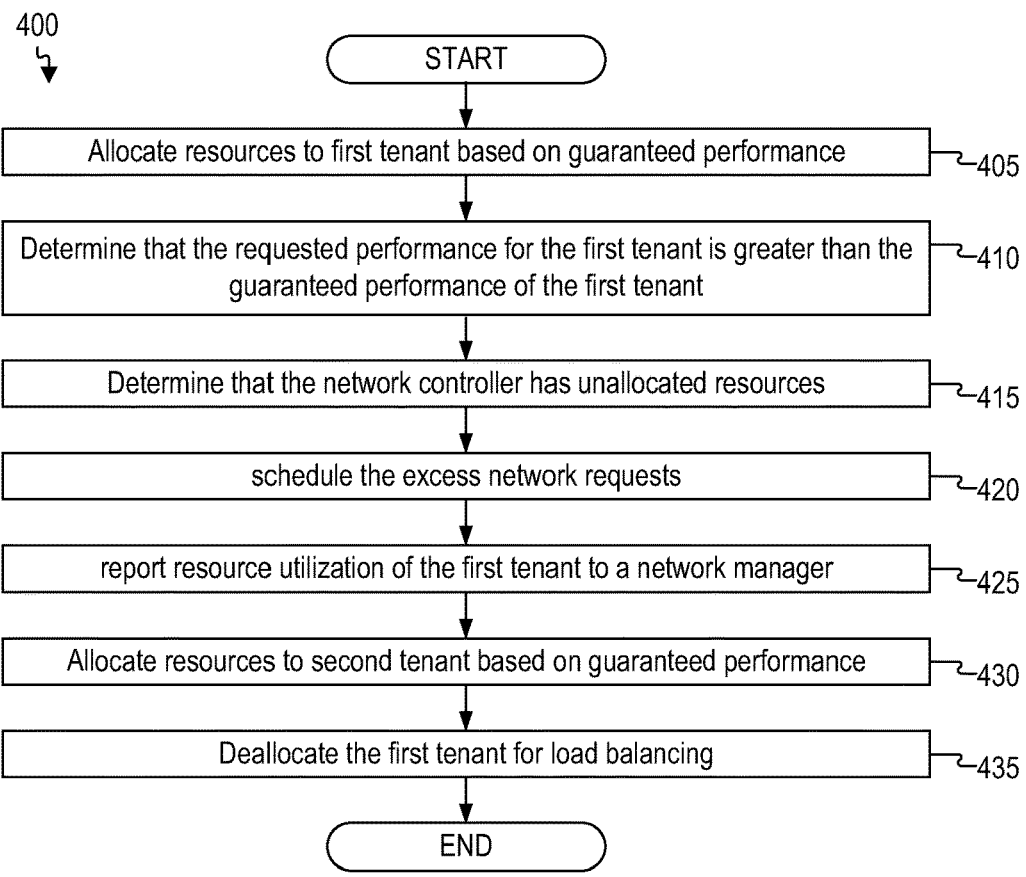
FIG. 4 is a flowchart of a method of a network controller in a multi-tenant control plane in accordance with an embodiment.

FIG. 4 illustrates an example method 400 that is performed by a network controller in a multi-tenant environment. In some examples, the network controller can be implemented in hardware but can be executed a virtualized environment (e.g., a virtual controller or a virtual network controller) to provide redundancy, scalability, and other benefits. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes allocating resources of the network controller to the first tenant at block 405. In some examples, the network controller (e.g., a virtual controller) may receive a request to create a first tenant, and the request may include a profile having a minimum quality of service that can be guaranteed to the first tenant. For example, the profile identifies a quantity of resources such as network bandwidth and memory consumption. The network bandwidth may be based on the number or network routes and the number of policy sequences that get exchanged. In some cases, the resources included in the profile may include a processor computation time (e.g., a dedicated amount of time for processor to allocate within a specific time interval such as 1 minute, 1 hour, etc.).

The network controller is configured to provide a quality of service to a plurality of tenants that are hosted on the network controller. As will be described in further detail below, the tenants can be located in a single virtual machine and provided a minimum quality of service and can be allowed to exceed those capabilities based on unutilized resources. Virtual machines can be configured to provide a fixed amount of resources to a tenant of that virtual machine but cannot exceed the fixed resources.

Accordingly, when the processor 910 that is implemented by the network controller receives a request to allocate the first tenant, the processor 910 may allocate the resources of the network controller to the first tenant, and the resources may include a first tenant quantity of resources (e.g., memory, network bandwidth). In addition, each tenant is connected to another network controller in the event of failure of the network controller. The other network controller may be in a different geographical region in the event of site failure, thereby providing geographic redundancy in the event of minor and major events.

Further, the method 400 comprises transmitting a response to the network controller indicating that the first tenant is created. For example, the processor 910 may transmit a response to the network controller indicating that the first tenant is created.

In response to allocating resources, the method 400 creates an instance of the first tenant, performs control plane functions to control edge network devices (e.g., edge network device 142), and monitors network requests of the first tenant. That is, in response to network requests from the first tenant, the method 400 determines that resources requested by the first tenant are greater than the first tenant quantity of guaranteed resources at block 410. In this example, the requested resources comprises network bandwidth (e.g., policies and routes) that exceed the first tenant's guaranteed performance. In some examples, the processor 910 determines that resources requested by the first tenant are greater than the tenant's quantity of guaranteed resources and calculates a difference between the requested network resources and first tenant's guaranteed resources, which will be referred to as an additional resources for clarity.

According to some examples, the method 400 includes determining that the network controller has unutilized resources sufficient to at least partially provide additional resources at block 415. For example, after determining the excess network performance, the processor 910 may determine that the network controller has unallocated resources. The unutilized resources can be unallocated resources that could be used for another tenant and can be resources associated with another tenant that are being unutilized. That is, because the processor 910 resources are not fully utilized, the processor can allow a tenant to temporarily exceed their guaranteed resources. In the event that there are no unutilized resources, the processor 910 is unable to provide additional resources to the first tenant.

In the event that there are unutilized resources in the network controller, the method 400 includes temporarily provisioning the additional resources to the tenant at block 420. More specifically, the unutilized resources are shared among all tenants in the network controller, and the additional network performance is scheduled based on a best effort. In some examples, the processor 910 may have a queue and all additional resources are placed in the queue and executed in the order it was received. As an example, a tenant may be allocated a burst of network bandwidth for a short period of time. If another tenant also requests additional network bandwidth, the network controller could schedule the tenants to share the extra network bandwidth using time slots (e.g., time division). Accordingly, the processor 910 may temporarily provision the additional resources based on a best effort.

According to some examples, the method 400 includes reporting resources utilization to a network manager at block 425. For example, the processor 910 may report resources utilization (e.g., additional resource requests, average utilization of network bandwidth, memory consumption, processor computation time, etc.) by the first tenant to a network manager.

Thus, the method 400 describes scaling network controllers to provide large-scale tenants with guaranteed resources to keep their network running in a stable fashion while also preventing starvation of resources to small-scale tenants. The method 400 further minimizes the number of network controllers to save cost, maintains fairness among tenants in the multi-tenant environment, and allows tenants to equitably share unutilized resources of the network controller. As noted above, tenants are connected to network controllers in different geographic locations to provide network redundancy and prevent network outages.

According to some examples, the method 400 include, in response to receiving a request, allocating the resources of the network controller to a second tenant at block 430. For example, another network controller may fail, and tenants hosted at the failed network controller may need to migrate. In that case, the processor 910 of the network controller may receive a request to allocate the resources of the network controller to a second tenant.

According to some examples, the method 400 includes, in response to receiving a request, deallocating the instance of the first tenant at block 435 based on a load balancing. In some cases, a network manager may determine that the network controllers will be unbalanced and may need to reallocate tenants to different network controllers. For example, the guaranteed resources of all tenants in the network controller (e.g., the first tenant, the second tenant, and other tenants) may be greater than maximum resources of the network controller and therefore the network controller may identify that the resources will be equitably balanced by moving the first tenant to another network controller. Accordingly, the processor 910 may receive a request to deallocate the resources of the network controller for the first tenant to allow the network controller to balance tenants within a plurality of network controllers.

Figure 5:
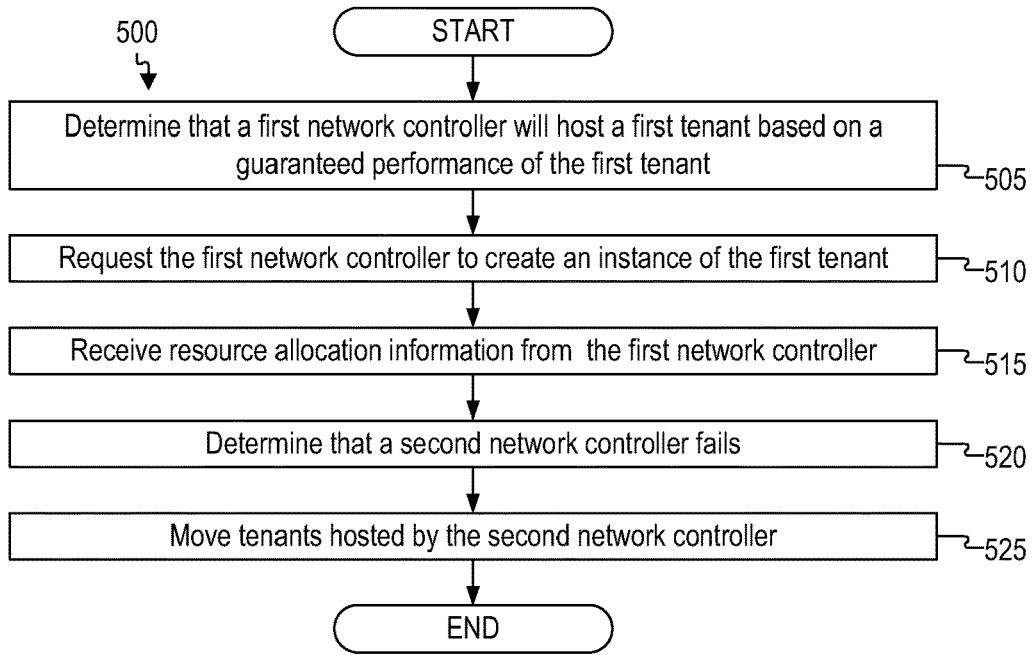
FIG. 5 is a flowchart of a method of a network manager for balancing loads in a multi-tenant control plane in accordance with an embodiment.

FIG. 5 illustrates an example method 500 of a network manager for balancing loads in a multi-tenant environment. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

Figure 9:
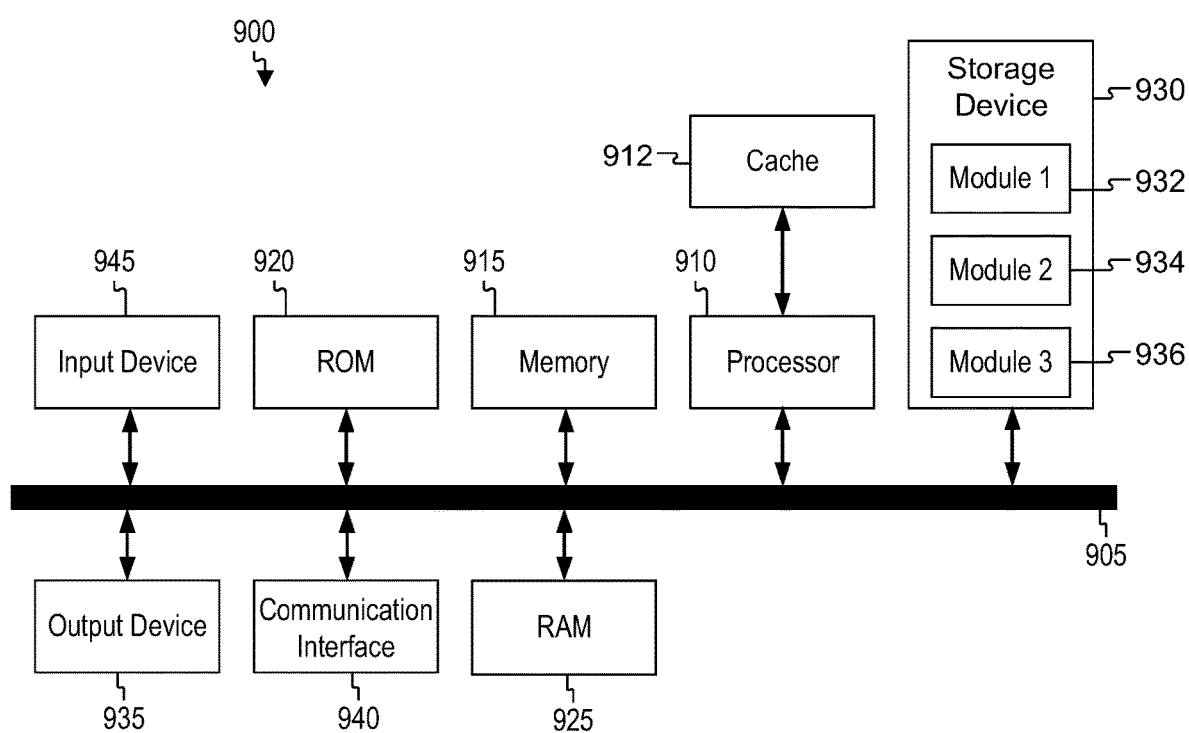
FIG. 9 shows an example of computing system 900, which can be for example any computing device that can implement components of the system

According to some examples, the method 500 is performed by a network manager, which includes a processor 910 illustrated in FIG. 9, to manage a cluster of network controllers. The method 500 includes, in response to a request to allocate a first tenant, determining a first network controller that will host the first tenant based on quality of service such as guaranteed resources for the first tenant at block 505. For example, a customer may request the provisioning of the first tenant and, in response, the processor 910 of a network manager may determine a first network controller that will host the first tenant based on minimum resources that can be guaranteed for the first tenant. For example, the processor 910 identifies different network controllers in a cluster and identifies the first network controller has sufficient unallocated resources to allow provide the first tenant with the resources. In some examples, the method 500 may create a new instance of a network controller for the first tenant.

According to some examples, the method 500 includes requesting the first network controller to create an instance of the first tenant at block 510. For example, because the first network controller is determined to have sufficient resources that can be allocated to the first tenant, the processor 910 of the network manager may request the first network controller to create an instance of the first tenant.

According to some examples, the method 500 includes receiving resource consumption information from the first network controller at block 515. The resource consumption information includes resource consumption information of each tenant in the first network controller. For example, the resource consumption information identifies resource usage such as network consumption, memory consumption, processor compute time, and so forth. For example, the processor 910 may receive resource consumption information of tenants assigned to the first network controller and determine instances when the resources requested by the first tenant are greater than the minimum guaranteed resources. In some examples, the network controller (e.g. virtual controller) or the network manager may determine that the first tenant consumes additional resources.

According to some examples, the method 500 includes determining that a second network controller has failed at block 520. For example, the site hosting the second network controller 520 could lose power, and the processor 910 would determine that the second network controller has failed. In this example, the second network controller allocated a minimum quantity of guaranteed resources to a second tenant and the network manager must move the second tenant due to the site failure.

According to some examples, the method 500 includes moving tenants from the second network controller based on a load balancing operation at block 525. For example, the processor 910 of the network manager may determine that the first network controller will host the second tenant based on a quality of service for the second tenant. The quality of service can be a minimum quantity of guaranteed resources. In this example, the processor 910 of the network manager requests the first network controller to create an instance of the second tenant.

In some cases, at block 525, the method 500 may also determine to distribute tenants based on a balanced utilization of the network controllers. Accordingly, the processor 910 may determine that a third network controller will host the first tenant based on the load balancing. For instance, the a minimum quantity of guaranteed resources to the second tenant is greater than the a minimum quantity of guaranteed resources to the first tenant and the first network controller will have a higher utilization if the second tenant is hosted. That is, because the first network controller has more unutilized resources than the third network controller, moving the second tenant to the first network controller and moving the first tenant to the third network controller more efficiently utilizes each network controller.

Thus, the processor 910 may determine that the first network controller and the third network controller have balanced loads based on moving the first tenant to the third network controller. Accordingly, the processor 910 requests the first network controller to deallocate the instance of the first tenant and requests the third network controller to allocate an instance of the first tenant. Thus, the method 500 uses a minimum quantity of guaranteed resources to maximize usage of each network controller.

Figure 6:
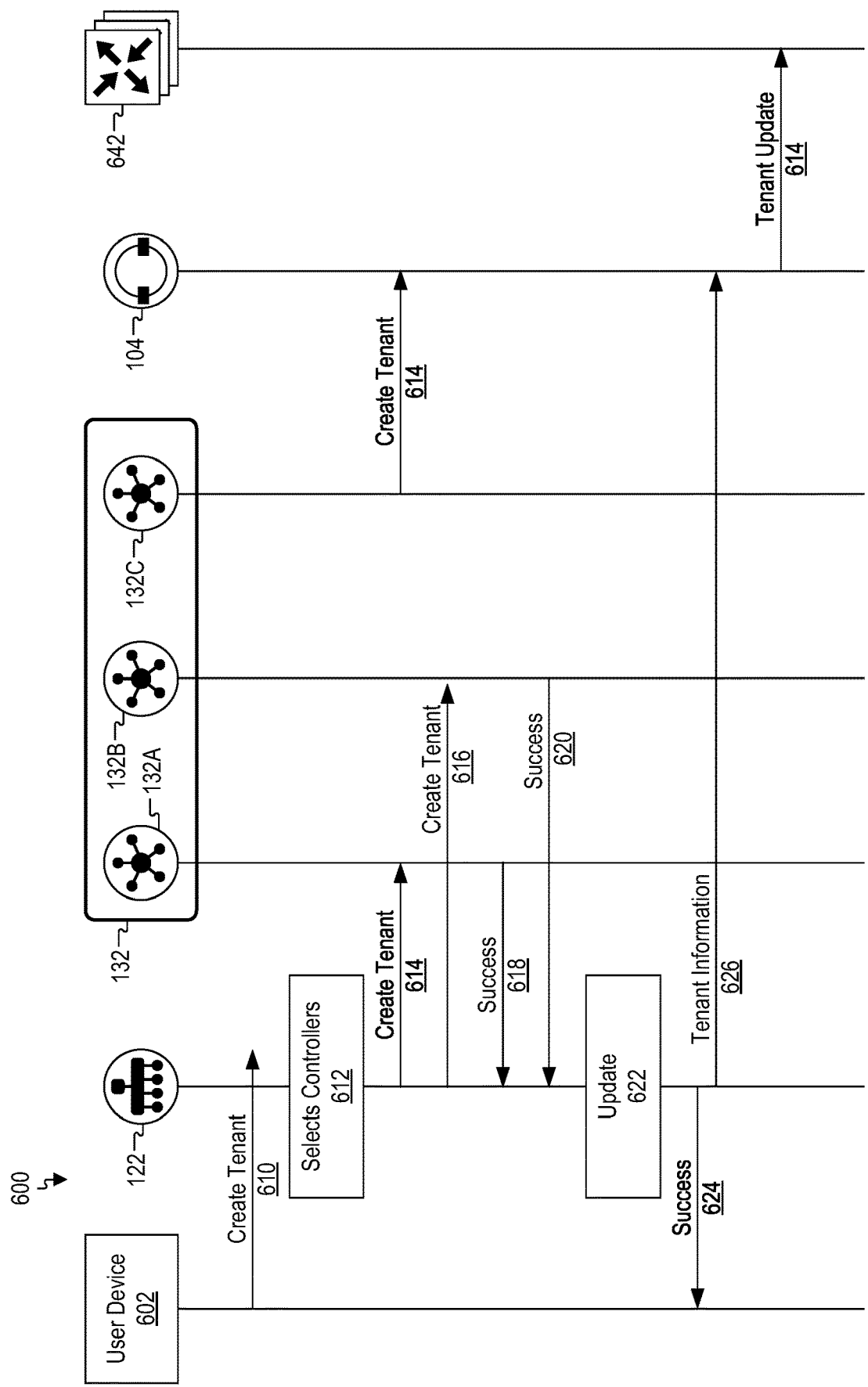
FIG. 6 illustrates an example flow diagram of a tenant on-boarding process in a multi-tenant control plane in accordance with an embodiment.

FIG. 6 illustrates an example flow diagram of a tenant on-boarding process in a multi-tenant environment 600. The multi-tenant environment 600 includes a user device 602, a network manager 122, a cluster of network controllers 132, a network orchestrator 104, and edge network devices 142. In the illustrated example, the cluster of network controllers 600 illustrates a first network controller 132A, a second network controller 132B, and a third network controller 132C that are presumed to geographically distributed. The cluster of network controllers 132 only illustrates three network controllers for simplicity and more network controllers can be included based on network operator capacity.

Initially, the user device 602 requests the network manager 122 to create a tenant at step 610. The request from the user device 602 includes various parameters for the tenant such as bandwidth utilization, memory requirements, geographic regions, and any other pertinent information. The network manager 122 analyzes the request and determines a quality of service (e.g., a minimum resources that can be guaranteed) based on the request. Based on the quality of service, the network manager determines that the first network controller 132A and the second network controller 132B have sufficient resources to achieve the quality of service for the tenant at step 612. The network manager 122 transmits a request to the first network controller 132A at step 614 and transmits a request to the second network controller 132B at step 616.

The first network controller 132A creates the tenant and returns an acknowledgement that the tenant was successfully created at step 618. The second network controller 132B creates the tenant and returns an acknowledgement that the tenant was successfully created at step 620. In response to the creating the tenants in the first network controller 132A and the second network controller 132B, the network manager 122 updates a database related to any parameters, network profiles, and any other information to manage the network controllers 132. The network manager 132 returns an acknowledgement that the tenant was successfully created at step 624.

The network manager 122 then transmits tenant information in message to a network orchestrator 104 at step 626. In response to the tenant information, the network orchestrator 104 transmits tenant placement information to the edge network devices 142 to cause the edge network devices to form connections with the appropriate network controllers 132 based on tenant provisioning within the network controller 132.

Figure 7A:
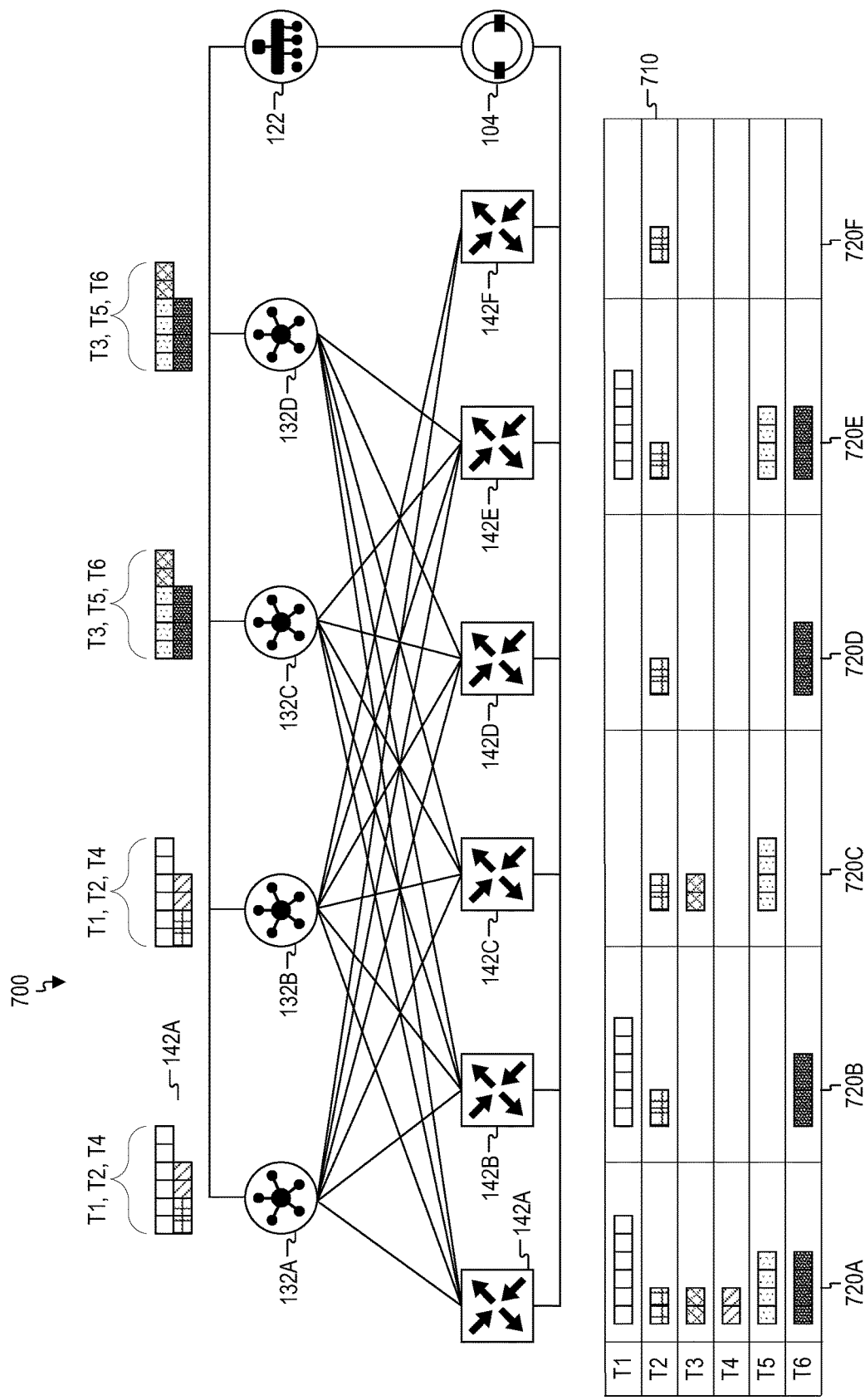
FIGS. 7A, 7B, and 7C illustrate an example of tenant migration in a multi-tenant control plane 700 in accordance with an embodiment.
Figure 7B:
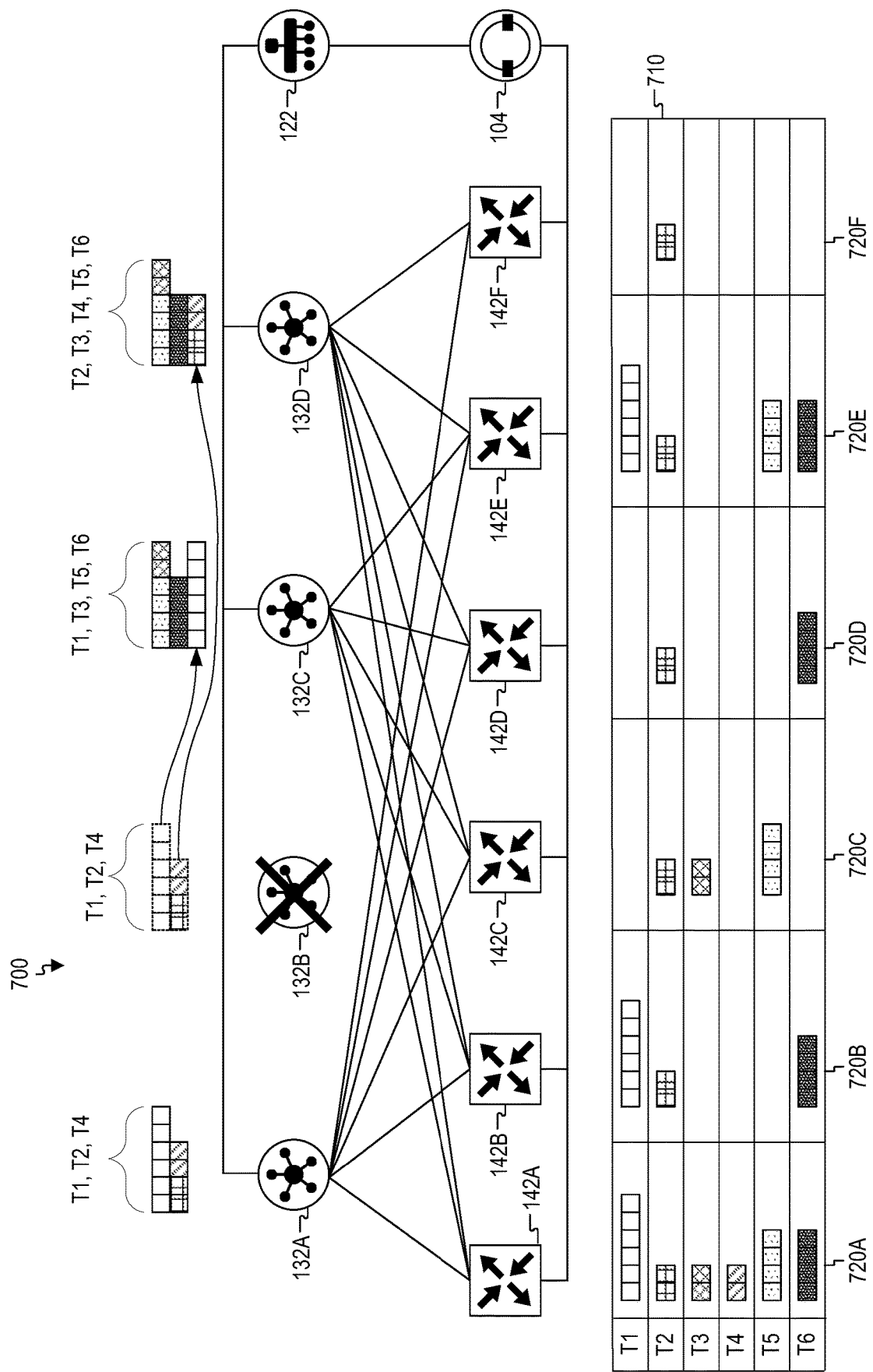
Figure 7C:
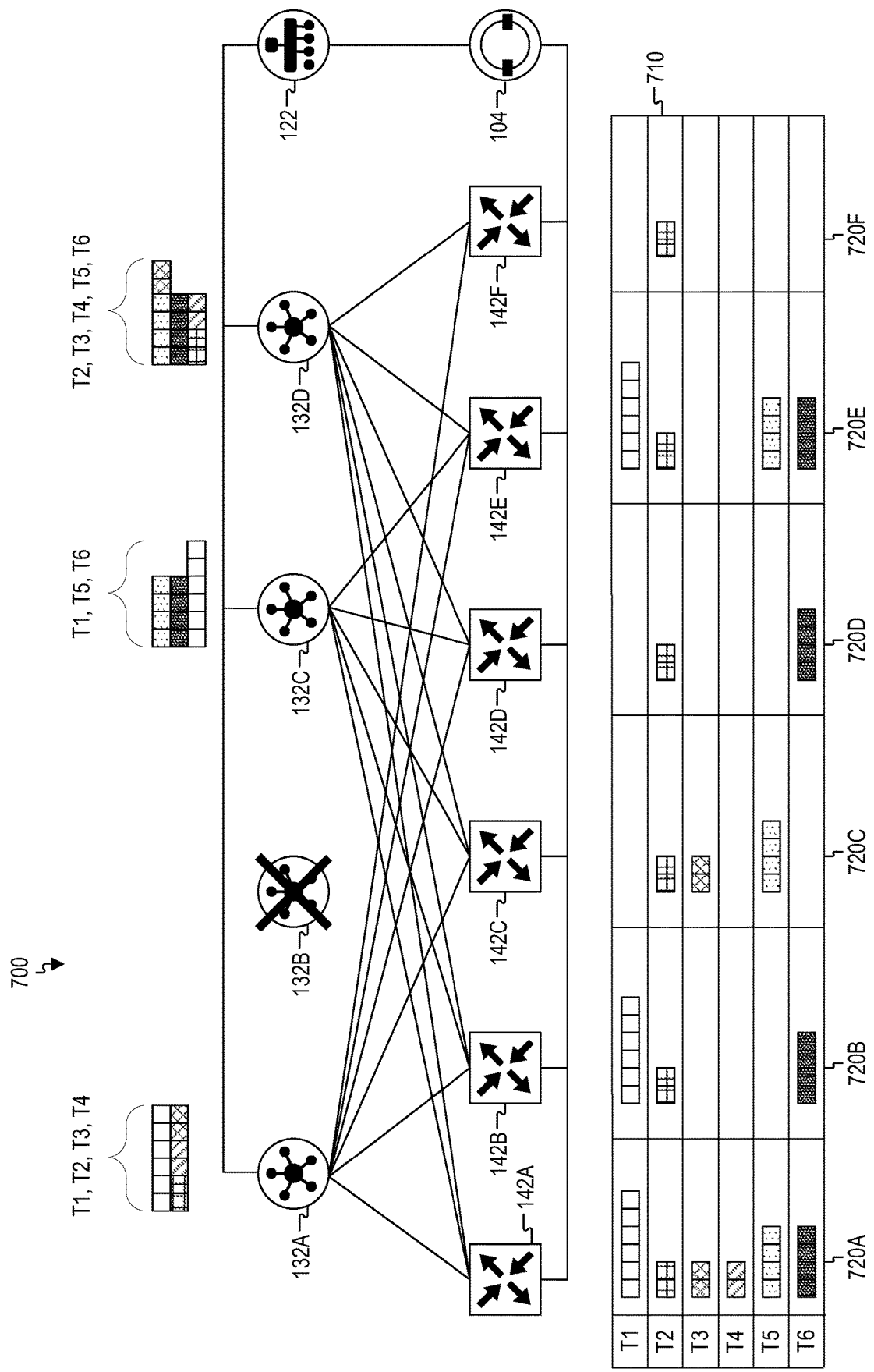

FIGS. 7A, 7B, and 7C illustrate an example of tenant migration in a multi-tenant environment 700. In particular, FIG. 7A illustrates an initial state of the multi-tenant environment 700 with network controller 132A, network controller 132B, network controller 132C, and network controller 134D being configurable to provide control plane functions for edge network device 142A, edge network device 142B, edge network device 142C, edge network device 142D, edge network device 142E, and edge network device 142F.

In the multi-tenant environment 700, six different tenants (T1-T6) can be allocated to the network controllers 132 and each tenant can have a different network utilization requirement, which are graphically illustrated as units or bins in FIG. 7A. For example, tenant T1 is a large tenant and consume six units of resources, tenants T2, T3, and T4 are small tenants and consume two units of resources each, and tenants T5 and T6 are medium tenants and consume four units of resources each. In some cases, each network controller 132 also has a maximum quantity of resources that can be provided (e.g., 10 units).

Each network controller 132 includes assigned tenants that demarcated by an allocated load 720. For example, the network controller 132A and network controller 132B are both assigned to host tenants T1, T2, and T4 and therefore each are allocated 10 units of resources. The network controller 132C and network controller 132D are both assigned to host tenants T3, T5, and T6 and therefore each are allocated 10 units of resources.

The table 710 illustrates tenant reservations in each corresponding edge network device 142. For example, column 720A illustrates that edge network device 142A has reservations for tenants T1-T6, column 720B illustrates that edge network device 142B has reservations for tenants T1, T2, and T6, and column 720C illustrates that edge network device 142C has reservations for tenants T2, T3, and T5. Column 720D illustrates that edge network device 142D has reservations for tenants T2 and T6, column 720E illustrates that edge network device 142E has reservations for tenants T1, T2, T5, and T6, and column 720C illustrates that edge network device 142F has a reservation for tenant T6.

In this case, each edge network devices 142 connect to network controllers 132 based on their reservations. For example, edge network device 142F is only connected to network controller 132A and network controller 132B because the edge network device 142F is configured with tenant T2 and no other tenant.

FIG. 7B illustrates that network controller 132B fails (e.g., due to a power outage) and tenants T1, T2, and T4 need to be migrated to another network controller. In this case, tenants T1, T2, and T4 are already hosted on network controller 132A. Therefore, tenant T1 is migrated to be hosted on network controller 132C and tenants T2 and T4 are migrated to be hosted on network controller 132D.

However, the network manager 122 may detect an imbalance based on the resources. In FIG. 7B, the network controller 132A is expected to provide 10 units of resources, the network controller 132C is expected to provide 16 units of resources, and the network controller 132D is expected to provide 14 units of resources. Accordingly, the network manager 122 may reallocate the tenants based on existing connections, load balancing, and redundancy.

FIG. 7C illustrates that the network manager 122 migrates tenant T3 from network controller 132C to network controller 132A, which causes the network controller 132A to be expected to provide 12 units of resources, the network controller 132C to be expected to provide 14 units of resources, and the network controller 132A to be expected to provide 14 units of resources. Thus, in FIG. 7B, there was a deviation of 6 units of resources and in FIG. 7C, there is a deviation of 2 units of resources.

The network controller 132 provides the tenant information to the network orchestrator 104, which updates tenants in each edge network device 142. In particular, FIG. 7C illustrates that the edge network device 142F disconnects from the network controller 132C because tenant T2 is no longer hosted there, and the edge network device 142F connects to network controller 132D by virtue of hosting tenant T2.

Figure 8:
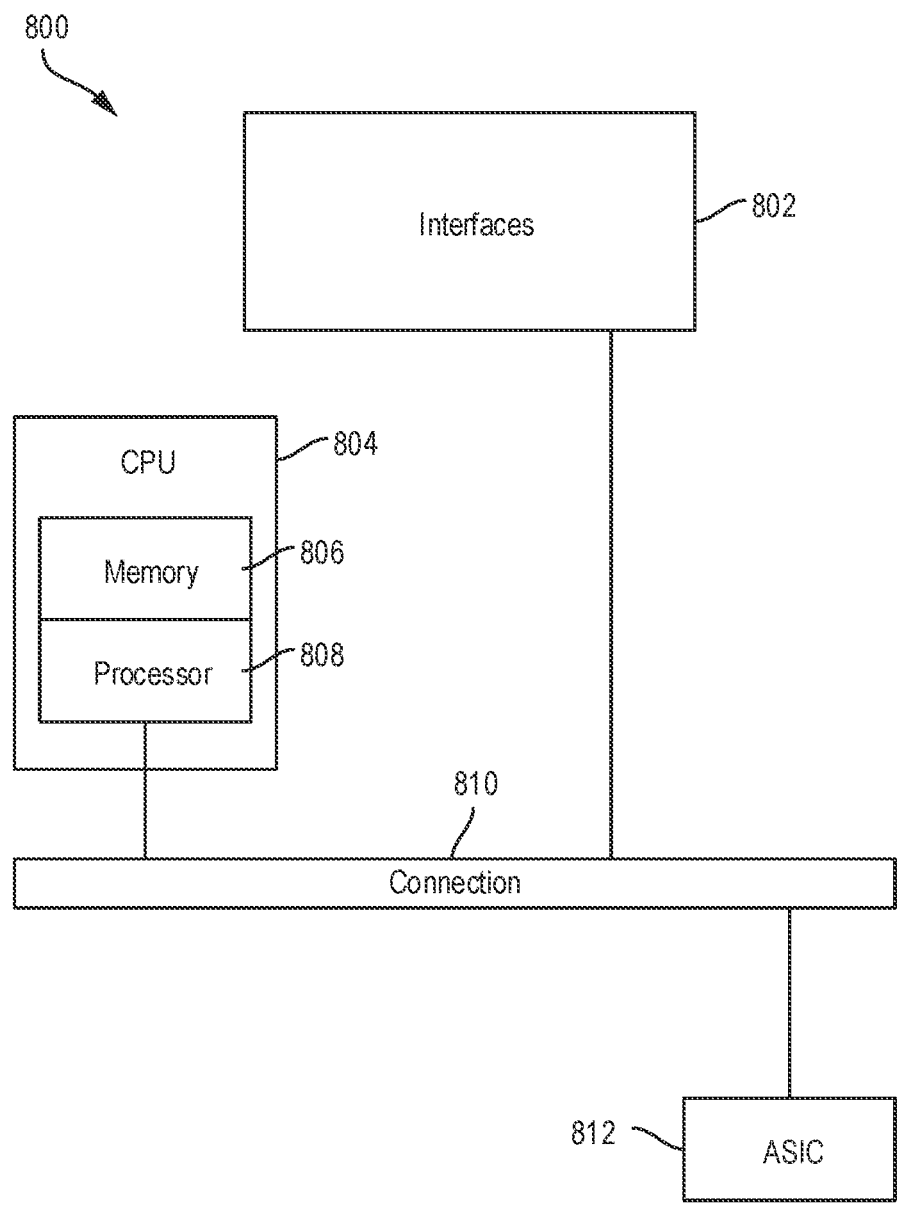
FIG. 8 illustrates an example network device in accordance with some examples of the disclosure.

FIG. 8 illustrates an example network device 800 suitable for performing switching, routing, load balancing, and other networking operations. The example network device 800 can be implemented as switches, routers, nodes, metadata servers, load balancers, client devices, and so forth.

Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 804) to efficiently perform routing computations, network diagnostics, security functions, etc.

Although the system shown in FIG. 8 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

FIG. 9 shows an example of computing system 900, which can be for example any computing device making up a network orchestrator 104, a network manager 122, a network controller 132, an edge network device 142, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples include:

Aspect 1. A method for allocating resources of a virtual controller to a first tenant, the method comprising: allocating resources of a virtual controller to a first tenant, wherein the first tenant is allocated a first tenant quantity of guaranteed resources of the virtual controller and a second tenant is allocated a second tenant quantity of guaranteed resources of the virtual controller; determining that resources requested by the first tenant are greater than the first tenant quantity of guaranteed resources; determining that the virtual controller has unutilized resources sufficient to at least partially provide additional resources beyond the first tenant quantity of guaranteed resources to the first tenant; temporarily provisioning the additional resources to the first tenant, wherein the additional resources are greater than the first tenant quantity of guaranteed resources.

Aspect 2. The method of Aspect 1, wherein the temporary provisioning of the additional resources is provided on a best effort basis.

Aspect 3. The method of any of Aspects 1 to 2, further comprising: receiving a request to allocate the resources of the virtual controller to a third tenant based on a second tenant quantity of guaranteed resources of the virtual controller, wherein a second virtual controller hosting the third tenant failed; and receiving a request to deallocate the instance of the first tenant, wherein a network manager moves the first tenant to a third virtual controller to balance a plurality of virtual controllers.

Aspect 4. The method of any of Aspects 1 to 3, wherein guaranteed resources for tenants including the first tenant, the second tenant, and third tenant are greater than maximum resources of the virtual controller, and wherein guaranteed resources for tenants including the second tenant and the third tenant and excluding the first tenant are less than the maximum resources of the virtual controller.

Aspect 5. The method of any of Aspects 1 to 4, wherein the resources comprise network bandwidth and memory consumption.

Aspect 6. The method of any of Aspects 1 to 5, wherein the virtual controller provides a quantity of guaranteed resources to a plurality of tenants.

Aspect 7. The method of any of Aspects 1 to 6, wherein the plurality of tenants are allocated resources in a single virtual machine.

Aspect 8. A method of a network manager that manages a plurality of virtual controllers, comprising: determining a first virtual controller will host a first tenant based on a first tenant quantity of guaranteed resources and available resources in the first virtual controller; requesting the first virtual controller to create an instance of the first tenant; and receiving resource consumption information of tenants assigned to the first virtual controller, wherein the resource consumption information includes information that identifies the first tenant requests additional resources beyond the first tenant quantity of guaranteed resources and the first virtual controller temporarily provisions the additional resources to the first tenant.

Aspect 9. The method of Aspect 8, further comprising: determining that a second virtual controller has failed, wherein the second virtual controller allocated resources to a second tenant based on a second tenant quality of service; determining the first virtual controller will host the second tenant based on the second tenant quantity of service; and determining a third network controller will host an instance of the first tenant based on a load balancing of the plurality of virtual controllers.

Aspect 10. The method of any of Aspects 8 to 9, further comprising: determining that the first virtual controller and the third virtual controller have balanced loads based on moving the instance of the first tenant to the third virtual controller.

Aspect 11. The method of any of Aspects 8 to 10, wherein the resources comprise network bandwidth and memory consumption.

Aspect 12. The method of any of Aspects 8 to 11, wherein each tenant of the first virtual controller are temporarily provisioned with unutilized resources of the first virtual controller on a best effort basis.

Aspect 13. The method of any of Aspects 8 to 12, wherein the plurality of tenants are allocated resources in a single virtual machine.

Aspect 14: A network device for managing a plurality of virtual controllers includes a transceiver (e.g., a network interface, a wireless transceiver, etc.) and a processor coupled to the transceiver. The processor configured to execute instructions and cause the processor to: allocate resources of a virtual controller to a first tenant, wherein the first tenant is allocated a first tenant quantity of guaranteed resources of the virtual controller and a second tenant is allocated a second tenant quantity of guaranteed resources of the virtual controller; determine that resources requested by the first tenant are greater than the first tenant quantity of guaranteed resources; determine that the virtual controller has unutilized resources sufficient to at least partially provide additional resources beyond the first tenant quantity of guaranteed resources to the first tenant; and temporarily provision the additional resources to the first tenant, wherein the additional resources are greater than the first tenant quantity of guaranteed resources.

Aspect 15: The network device of Aspect 14, wherein the temporary provisioning of the additional resources is provided on a best effort basis.

Aspect 16: The network device of any of Aspects 14 to 15, wherein the processor is configured to execute the instructions and cause the processor to: receive a request to allocate the resources of the virtual controller to a third tenant based on a second tenant quantity of guaranteed resources of the virtual controller, wherein a second virtual controller hosting the third tenant failed; and receive a request to deallocate the instance of the first tenant, wherein a network manager moves the first tenant to a third virtual controller to balance a plurality of virtual controllers.

Aspect 17: The network device of any of Aspects 14 to 16, wherein guaranteed resources for tenants including the first tenant, the second tenant, and third tenant are greater than maximum resources of the virtual controller, and wherein guaranteed resources for tenants including the second tenant and the third tenant and excluding the first tenant are less than the maximum resources of the virtual controller.

Aspect 18: The network device of any of Aspects 14 to 17, wherein the resources comprise network bandwidth and memory consumption.

Aspect 19: The network device of any of Aspects 14 to 18, wherein the virtual controller provides a quantity of guaranteed resources to a plurality of tenants.

Aspect 20: The network device of any of Aspects 14 to 19, wherein the plurality of tenants are allocated resources in a single virtual machine.

Aspect 21: A network device for managing a plurality of virtual controllers includes a transceiver (e.g., a network interface, a wireless transceiver, etc.) and a processor coupled to the transceiver. The processor configured to execute instructions and cause the processor to: determine a first virtual controller will host a first tenant based on a first tenant quantity of guaranteed resources and available resources in the first virtual controller; request the first virtual controller to create an instance of the first tenant; and receive resource consumption information of tenants assigned to the first virtual controller, wherein the resource consumption information includes information that identifies the first tenant requests additional resources beyond the first tenant quantity of guaranteed resources and the first virtual controller temporarily provisions the additional resources to the first tenant.

Aspect 22: The network device of Aspect 21, wherein determining that a second virtual controller has failed, wherein the second virtual controller allocated resources to a second tenant based on a second tenant quality of service; determine the first virtual controller will host the second tenant based on the second tenant quantity of service; and determine a third network controller will host an instance of the first tenant based on a load balancing of the plurality of virtual controllers.

Aspect 23: The network device of any of Aspects 21 to 22, wherein the processor is configured to execute the instructions and cause the processor to: determine that the first virtual controller and the third virtual controller have balanced loads based on moving the instance of the first tenant to the third virtual controller.

Aspect 24: The network device of any of Aspects 21 to 23, wherein the resources comprise network bandwidth and memory consumption.

Aspect 25: The network device of any of Aspects 21 to 24, wherein each tenant of the first virtual controller are temporarily provisioned with unutilized resources of the first virtual controller on a best effort basis.

Aspect 26: The network device of any of Aspects 21 to 25, wherein the plurality of tenants are allocated resources in a single virtual machine.

What is claimed is:

1. A method for allocating resources of at least one virtual controller to a first tenant and a second tenant, the method comprising:
   provisioning, with the at least one virtual controller, the first and second tenants;
   transmitting tenant placement information to edge network devices to cause the edge network devices to form connections with an appropriate one of the at least one virtual controller based on the tenant placement information;
   allocating resources of the at least one virtual controller to a first tenant, wherein the first tenant is allocated a first tenant quantity of guaranteed resources of the at least one virtual controller and a second tenant is allocated a second tenant quantity of guaranteed resources of the at least one virtual controller;
   determining that resources requested by the first tenant are greater than the first tenant quantity of guaranteed resources;
   determining that the at least one virtual controller has unutilized resources sufficient to at least partially provide additional resources beyond the first tenant quantity of guaranteed resources to the first tenant; and
   temporarily provisioning the additional resources to the first tenant, wherein the additional resources are greater than the first tenant quantity of guaranteed resources,
   wherein the allocating resources and the temporarily provisioning the additional resources include dynamically linking network resources of an orchestration plane to a control plane and to underlying physical network hardware components in a data plane.

2. The method of claim 1, wherein the temporary provisioning of the additional resources is provided on a best effort basis.

3. The method of claim 1, further comprising:
   receiving a request to allocate the resources of the at least one virtual controller to a third tenant based on a second tenant quantity of guaranteed resources of the at least one virtual controller, wherein a second virtual controller hosting the third tenant failed; and
   receiving a request to deallocate the instance of the first tenant, wherein a network manager moves the first tenant to a third virtual controller to balance a plurality of virtual controllers.

4. The method of claim 3, wherein guaranteed resources for tenants including the first tenant, the second tenant, and third tenant are greater than maximum resources of the at least one virtual controller, and wherein guaranteed resources for tenants including the second tenant and the third tenant and excluding the first tenant are less than the maximum resources of the virtual controller.

5. The method of claim 1, wherein the resources comprise network bandwidth and memory consumption.

6. The method of claim 1, wherein the at least one virtual controller provides a quantity of guaranteed resources to a plurality of tenants.

7. The method of claim 6, wherein the plurality of tenants are allocated resources in a single virtual machine.

8. A method of a network manager that manages a plurality of virtual controllers, comprising:
   provisioning, with at least one of the virtual controllers, a first and second tenants;
   transmitting tenant placement information to edge network devices to cause the edge network devices to form connections with an appropriate one of the virtual controllers based on the tenant placement information;
   determining a first virtual controller will host a first tenant based on a first tenant quantity of guaranteed resources and available resources in the first virtual controller;
   requesting the first virtual controller to create an instance of the first tenant; and
   receiving resource consumption information of tenants assigned to the first virtual controller, wherein the resource consumption information includes information that identifies that the first tenant requests additional resources beyond the first tenant quantity of guaranteed resources and the first virtual controller temporarily provisions the additional resources to the first tenant,
   wherein the allocating resources and the temporarily provisioning the additional resources include dynamically linking network resources of an orchestration plane to a control plane and to underlying physical network hardware components in a data plane.

9. The method of claim 8, further comprising:
   determining that a second virtual controller has failed, wherein the second virtual controller allocated resources to a second tenant based on a second tenant quality of service;
   determining the first virtual controller will host the second tenant based on the second tenant quantity of service; and
   determining a third network controller will host an instance of the first tenant based on a load balancing of the plurality of virtual controllers.

10. The method of claim 9, further comprising:
    determining that the first virtual controller and the third virtual controller have balanced loads based on moving the instance of the first tenant to the third virtual controller.

11. The method of claim 8, wherein the resources comprise network bandwidth and memory consumption.

12. The method of claim 8, wherein each tenant of the first virtual controller are temporarily provisioned with unutilized resources of the first virtual controller on a best effort basis.

13. The method of claim 12, wherein the plurality of tenants are allocated resources in a single virtual machine.

14. A computing system for allocating resources of at least one virtual controller to a first tenant and a second tenant, comprising:
    a transceiver for sending and receiving network requests;
    a processor configured to execute instructions and cause the processor to:
      provision, with the at least one virtual controller, the first and second tenants;
      transmit tenant placement information to edge network devices to cause the edge network devices to form connections with an appropriate one of the at least one virtual controller based on the tenant placement information;
      allocate resources of the least one virtual controller to the first tenant, wherein the first tenant is allocated a first tenant quantity of guaranteed resources of the at least one virtual controller based on a first tenant quantity of guaranteed resources of the at least one virtual controller;

determine that resources requested by the first tenant are greater than the first tenant guaranteed resources;

determine that the at least one virtual controller has unutilized resources sufficient to at least partially provide additional resources beyond the first tenant quantity of guaranteed resources to the first tenant; and temporarily provision the additional resources to the first tenant, wherein the additional resources are greater than the first tenant quantity of guaranteed resources, wherein the instructions to allocate resources and the instructions to temporarily provision the additional resources include dynamically linking network resources of an orchestration plane to a control plane and to underlying physical network hardware components in a data plane.

15. The computing system of claim 14, wherein the temporary provisioning of the additional resources is provided on a best effort basis.

16. The computing system of claim 14, wherein the instructions further cause the processor to:

receive a request to allocate the resources of the at least one virtual controller to the second tenant based on a second tenant quantity of guaranteed resources, wherein a second virtual controller associated with the second tenant failed.

17. The computing system of claim 16, wherein the instructions further cause the processor to:

receive a request to deallocate the first tenant, wherein the at least one virtual controller moves the first tenant to a third virtual controller to balance a plurality of virtual controllers.

18. The computing system of claim 17, wherein the guaranteed resources for tenants including the first tenant and the second tenant is greater than maximum resources of the at least one virtual controller, and wherein the guaranteed resources for tenants including the second tenant and excluding the first tenant is less than the maximum resources of the at least one virtual controller.

19. The computing system of claim 14, wherein the resources comprise network bandwidth and memory consumption.

20. The computing system of claim 19, wherein the plurality of tenants are allocated resources in a single virtual machine.

* * * * *